United States Patent
Boley et al.

(10) Patent No.: US 11,639,208 B2
(45) Date of Patent: May 2, 2023

(54) FINAL DRIVE DISCONNECT MECHANISM VIA TRANSMISSION

(71) Applicant: ALLISON TRANSMISSION, INC., Indianapolis, IN (US)

(72) Inventors: Larry Boley, Zionsville, IN (US); Rick Daugherty, Clayton, IN (US); James Priest, Indianapolis, IN (US); Michael R. Toole, Pittsboro, IN (US); Bruce E. Crum, Brownsburg, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 17/740,493

(22) Filed: May 10, 2022

(65) Prior Publication Data
US 2022/0266931 A1 Aug. 25, 2022

Related U.S. Application Data

(63) Continuation of application No. 17/092,870, filed on Nov. 9, 2020, now Pat. No. 11,332,206, which is a
(Continued)

(51) Int. Cl.
*B62D 55/13* (2006.01)
*F16D 11/14* (2006.01)
(Continued)

(52) U.S. Cl.
CPC ............. *B62D 55/13* (2013.01); *F16D 11/14* (2013.01); *F16D 23/12* (2013.01); *F16H 1/16* (2013.01)

(58) Field of Classification Search
CPC .... F16D 11/14; F16D 2011/004; F16D 23/12; F16D 2023/123; B62D 55/125; B62D 55/13; B62D 65/02; B62D 65/10
See application file for complete search history.

(56) References Cited

U.S. PATENT DOCUMENTS 3,504,564 A   4/1970   Kell
3,960,230 A   6/1976   Van Wuytswinkel
(Continued)

FOREIGN PATENT DOCUMENTS

DE   102010045898 A1 * 10/2011 ............. F16D 11/14
GB       2529663 A  *  3/2016 ........... B60K 17/046
KR     101389237 B1 *  5/2014 ............. F16D 48/06

OTHER PUBLICATIONS

Notice of Preliminary Rejection; Korean Intellectual Property Office; Korean Application No. 10-2018-0056436; dated Jun. 30, 2022; 6 pages.

*Primary Examiner* — Bobby Rushing, Jr.
(74) *Attorney, Agent, or Firm* — Taft Stettinius & Hollister LLP; Stephen F. Rost

(57) ABSTRACT

A vehicle drivetrain for a vehicle including a transmission configured to move the vehicle with a surface engaging traction member and a final drive assembly configured to drive the surface engaging traction member. The final drive assembly includes a drive assembly coupler. A transmission coupler is operatively connected to the transmission and disposed between the transmission and the drive assembly coupler. The transmission coupler includes a first position engaged with the drive assembly coupler and a second position disengaged from the drive assembly coupler. An actuator is operatively connected to the transmission coupler and is configured to move the transmission coupler between the first position and the second position. The actuator, in one embodiment, includes a worm drive having a worm gear configured to move the transmission coupler along a longitudinal direction of the transmission. The worm gear rotates about an axis inclined with the longitudinal direction.

20 Claims, 10 Drawing Sheets

Related U.S. Application Data continuation of application No. 15/976,949, filed on May 11, 2018, now Pat. No. 10,829,169.

(60) Provisional application No. 62/507,420, filed on May 17, 2017.

(51) Int. Cl.
  *F16D 23/12* (2006.01)
  *F16H 1/16* (2006.01)

(56) References Cited

U.S. PATENT DOCUMENTS

| | | |
|---|---|---|
| 4,040,312 A | 8/1977 | Tappan et al. |
| 4,043,226 A | 8/1977 | Buuck |
| 4,244,399 A | 1/1981 | Palau et al. |
| 4,932,281 A | 6/1990 | Ordo |
| 5,267,915 A | 12/1993 | Estabrook |
| 5,353,890 A | 10/1994 | Clohessy |
| 9,163,674 B2 | 10/2015 | Combs et al. |
| 9,309,931 B2 * | 4/2016 | Hartz ............... F16D 11/14 |
| 9,649,933 B2 | 5/2017 | Oram et al. |
| 2002/0065156 A1 | 5/2002 | Younggren et al. |
| 2002/0091036 A1 | 7/2002 | Bott et al. |
| 2002/0125060 A1 | 9/2002 | Cigal |
| 2002/0169049 A1 | 11/2002 | Borgan et al. |
| 2003/0116365 A1 | 6/2003 | Thibault |
| 2003/0125150 A1 | 7/2003 | Tanzer |
| 2010/0108458 A1 | 5/2010 | Harris et al. |
| 2012/0031212 A1 | 2/2012 | Forrest |
| 2012/0193185 A1 | 8/2012 | Zhang |
| 2014/0262670 A1 | 9/2014 | Combs et al. |
| 2015/0300418 A1 | 10/2015 | Averill et al. |
| 2016/0076648 A1 | 3/2016 | Hartz et al. |
| 2016/0265602 A1 | 9/2016 | Pritchard |

* cited by examiner

FINAL DRIVE DISCONNECT MECHANISM VIA TRANSMISSION

RELATED APPLICATION

This application is a continuation application of U.S. patent application Ser. No. 17/092,870, filed Nov. 9, 2020, which is a continuation application of U.S. patent application Ser. No. 15/976,949, filed May 11, 2018, which claims priority to U.S. Provisional Patent Application Ser. No. 62/507,420 entitled "Final Drive Disconnect Mechanism Via Transmission" by Larry Boley et al., filed May 17, 2017, the disclosures of which are herein incorporated by reference in their entirety.

FIELD OF THE DISCLOSURE

The present invention relates to a transmission or final drive assembly, and in particular, to a disconnect mechanism for a transmission or final drive assembly.

BACKGROUND

Tracked vehicles include a prime mover for producing power and a transmission assembly for receiving the power for transfer to a driveline or final drive assembly. The final drive assembly provides power to a sprocket or drive hub that drives the tracks along a surface. Instead of tracks, a vehicle may include wheels that receive the power from the final drive assembly and operably move the vehicle along the surface. In any case, the transmission output is connected to an input of the final drive assembly.

At some point during vehicle operation it may be desirable or necessary to maintain or service the transmission or final drive. To do so, it is often necessary to remove the transmission or final drive from the vehicle. Before the transmission or final drive can be removed from the vehicle, however, the transmission output must be disconnected from the input final drive assembly. Alternatively, the final drive assembly can be completely removed, but this removal is often complex and requires labor-intensive work.

In some military vehicles having a track, for example, an access port or opening is provided for a technician to access the transmission output to disconnect the transmission output from the final drive assembly. In some configurations while accessibility to the access port can be relatively straightforward, maintenance in the field can be difficult due to the presence of mud, dirt, and other debris which can cover the access port. In other configurations, the design of the final drive assembly and sprocket for the track is such that there is limited or no access to disconnect a shaft. A separate port or access opening may be required on the interior of the vehicle.

In some instances, the final drive assembly may need to be disconnected from the vehicle before the transmission can be serviced. This again requires a substantial amount of time and effort and is less desirable in applications where a "quick disconnect" feature is preferred.

Thus, a need exists for providing a means for disconnecting a transmission output from a final drive assembly. Moreover, it is further desirable to design a disconnect mechanism for removably coupling a transmission output to a final drive.

SUMMARY

In one embodiment of the present disclosure, there is provided a vehicle drivetrain including a transmission configured to move a vehicle with a surface engaging traction member. The vehicle drivetrain includes a final drive assembly configured to drive the surface engaging traction member wherein the final drive assembly includes a drive assembly coupler. A transmission coupler is movably coupled to the transmission and is disposed between the transmission and the drive assembly coupler, wherein the transmission coupler includes a first position engaged with the drive assembly coupler and a second position disengaged from the drive assembly coupler. An actuator is operatively connected to the transmission coupler and is configured to move the transmission coupler between the first position and the second position.

In another embodiment, there is provided a method for disconnecting and connecting a transmission drive element of a transmission from a final drive assembly. The method includes: moving a transmission connector away from the transmission and toward the final drive assembly to engage a drive assembly connector with the transmission drive element; and disengaging the transmission connector from the drive assembly coupler, wherein the transmission connector moves away from the drive assembly coupler for the disengaging the transmission drive element from the final drive assembly.

In still another embodiment, there is provided a vehicle comprising a transmission, including a transmission drive element, wherein the transmission is configured to move the vehicle with a surface engaging traction member. The vehicle drivetrain includes a final drive assembly configured to drive the surface engaging traction member and a transmission coupler. The transmission coupler is coupled to the transmission and is disposed between the transmission and the final drive assembly, wherein the transmission coupler includes a first position engaged with the final drive assembly and a second position disengaged from the final drive assembly. An actuator is operatively connected to the transmission coupler and is configured to move the transmission coupler between the first position and the second position.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In a general sense, the present disclosure relates to the control of torque transfer from one member to another. In one condition, a first member and a second member can be coupled to one another such that torque can be transferred therebetween, and in a second condition the first and second members can be decoupled from one another such that torque cannot be transferred therebetween. While this disclosure provides different examples of this control in a vehicular application, the disclosure is not intended to be limited to this application. One skilled in the art will appreciate varying aspects of the present disclosure outside of the vehicular application provided herein.

Figure 1:
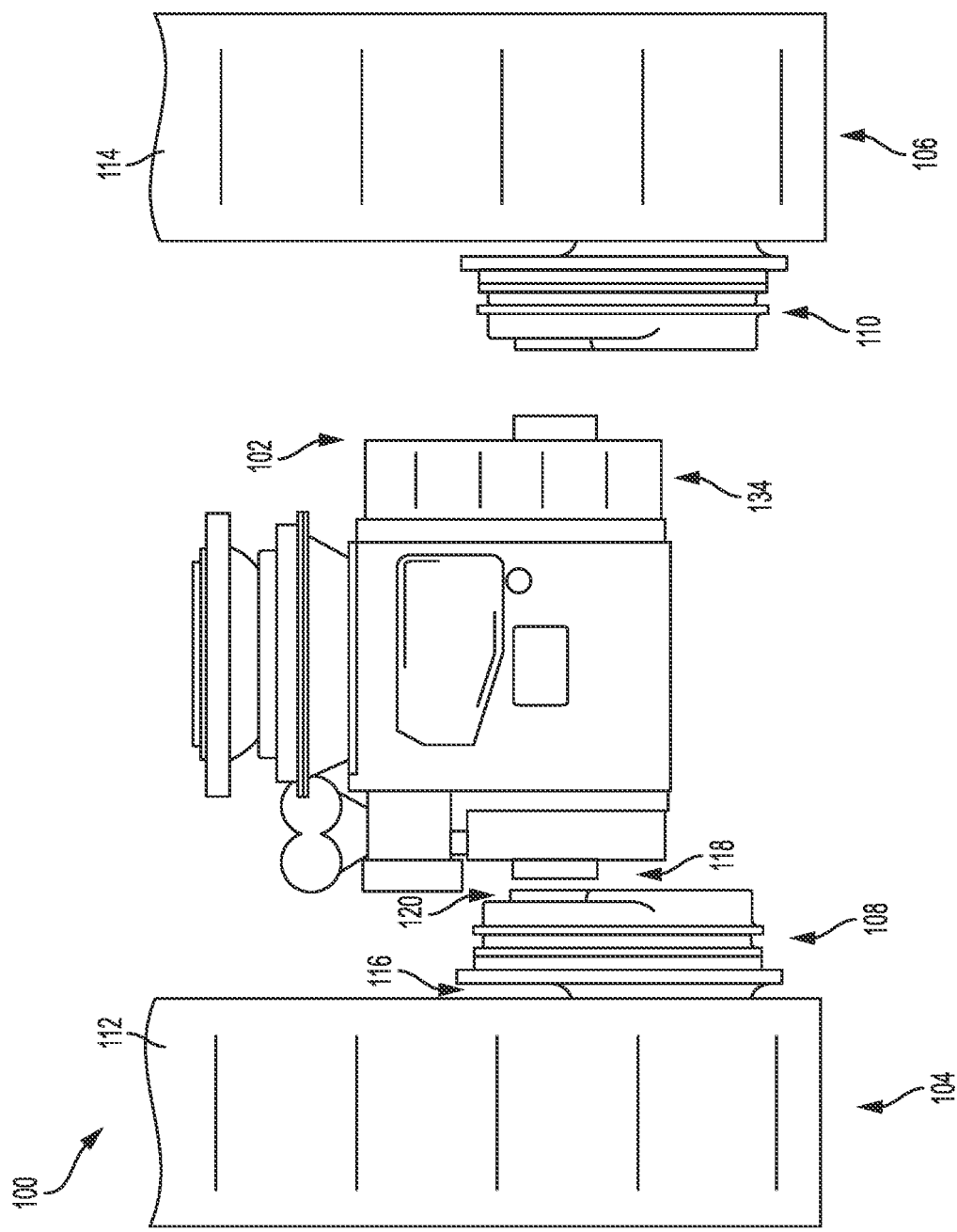
FIG. 1 illustrates a schematic depiction of a transmission assembly including a transmission output portion configured to couple to a final drive assembly.

With reference to FIG. 1, a first illustrated embodiment includes a portion of a vehicle or machine 100. The vehicle or machine 100 can be any on-highway or off-highway vehicle or machine. The machine 100 can be used as an agricultural, construction, forestry, military or other type of vehicle or machine. In FIG. 1, the machine 100 can include a transmission assembly 102 that can receive power from a power-generating mechanism such as a prime mover, engine, motor, etc. The transmission assembly 102 can transfer power or torque to a surface engaging tracking mechanism via a driveline, final drive assembly, or other means. The surface engaging traction member includes, but is not limited to a wheel, a track, or a ski, each of which is configured to engage a surface including one or more of ground, soil, pavement, vegetation, and rock.

The transmission assembly 102 of FIG. 1 includes an output portion 118 that can be coupled to an input portion 120 of a final drive assembly 108. The output portion 118 can be mechanically coupled to the input portion 120 via a gearing and shaft arrangement. For instance, the transmission assembly 102 can include a first shaft (not shown) disposed in the output portion 118. The first shaft can include a gear or sprocket (not shown) that can transfer torque to a second shaft (not shown) disposed in the input portion 120 of the final drive assembly 108.

The final drive assembly 108 can also include an output (not shown) that drives a first drive track 112 on a first side 104 of the vehicle or machine 100. The output can be rotatably coupled to a track sprocket (not shown) that drives the first drive track 112. Similarly, the vehicle or machine 100 can include a second drive track 114 disposed on a second side 106 thereof for moving the vehicle or machine 100 along a ground surface. In FIG. 1, the first drive track 112 can be powered by the first final drive assembly 108 and the second drive track 114 can be powered by a second final drive assembly 110. In this manner, the first drive track 112 and second drive track 114 form the ground-engaging mechanism of the vehicle or machine 100. As previously described, however, other vehicles or machines may include one or more wheels as the ground-engaging mechanism. Moreover, a different vehicle or machine may include additional drive tracks or a combination of wheels and drive tracks as ground-engaging mechanisms.

As described above, many conventional vehicles or machines require the transmission assembly to be disassembled or disconnected from the final drive assembly before the transmission assembly can be serviced. In some instances, the entire transmission assembly needs to be removed from the vehicle or machine. To do so, the output of the transmission is disconnected from the input of the final drive assembly. In some conventional arrangements, there is sufficient room to access the connection between the transmission assembly and final drive assembly to mechanically disconnect the two assemblies from one another. For example, a shaft that connects the output of the transmission assembly to the input of the final drive assembly can be removed without excessive effort. However, in other instances including that of FIG. 1, there is little to no room to access the connection between the output of the transmission assembly and the input of the final drive assembly.

In FIG. 1, for example, the first drive track 112 is driven by a track sprocket (not shown). The track sprocket is driven by an output (not shown) of the final drive assembly 108. An area or region 116 between the first drive track 112, and most notably its track sprocket, and the final drive assembly 108 can be extremely limited, thereby making it difficult, if not nearly impossible, to access the connection between the final drive assembly 108 and the transmission assembly 102. In addition, a connection location between the output portion 118 to the input portion 120 of a final drive assembly 108 is also one in which provides little extra room to connect or to disconnect the transmission 102 from the final drive assembly 108.

Figure 2:
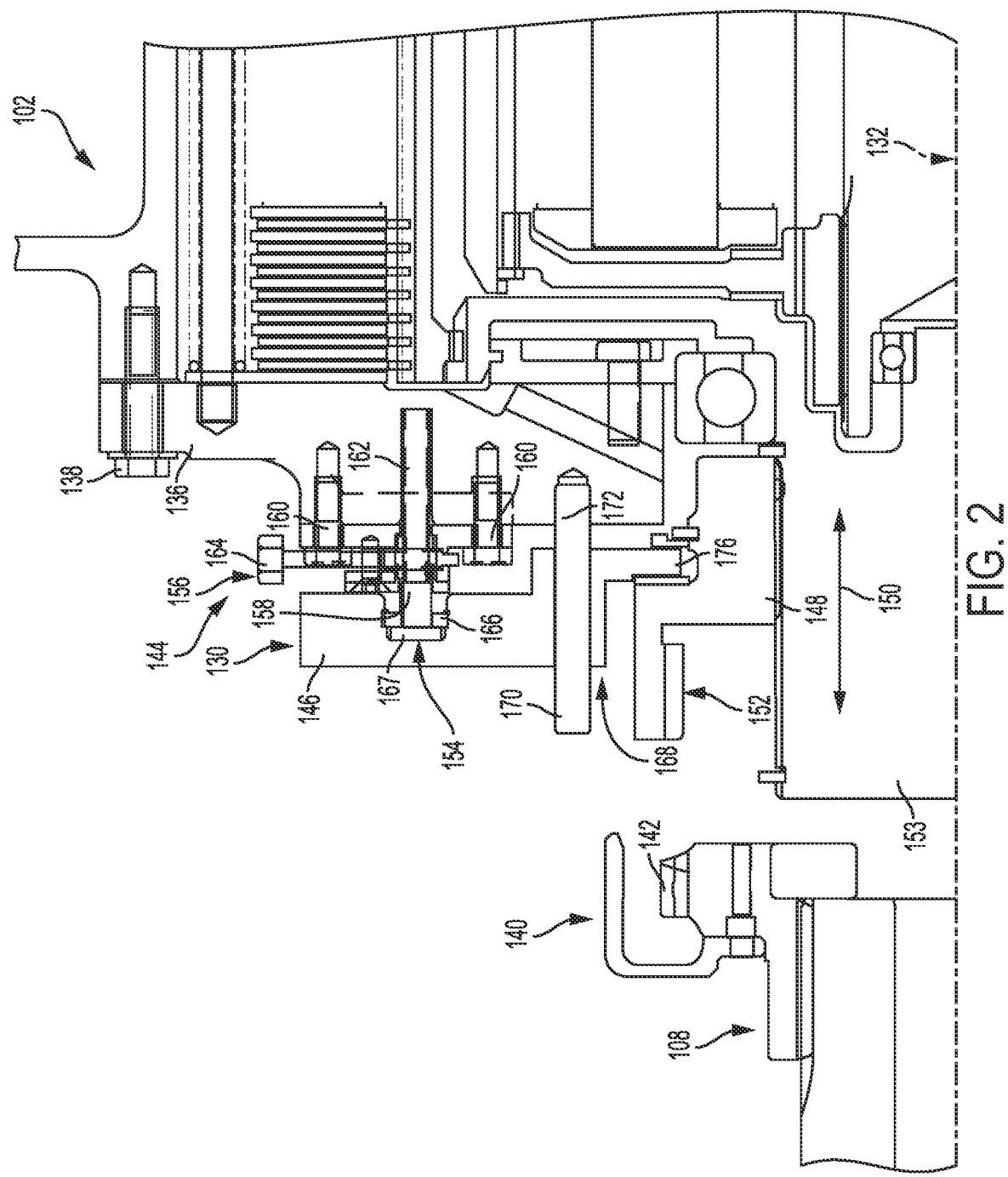
FIG. 2 illustrates a connect/disconnect mechanism of a transmission for connecting to and disconnecting from a final drive assembly in a disconnected condition.

The transmission 102 of the present disclosure includes a connect/disconnect mechanism or transmission coupler 130 which provides for connection and disconnection of the transmission 102 to and from the final drive assembly 108 as further illustrated in FIG. 2. FIG. 2 illustrates approximately one-half of the transmission 102 shown by a line 132. In addition, while FIG. 2 also illustrates one side of the transmission 102, a similar connect/disconnect mechanism (not shown) is provided at another side 134 of the transmission 102 of FIG. 1. The mechanism 130 is fixedly coupled to the transmission 102 at a flange or collar 136 which is coupled to the transmission with connectors 138, one of which is shown. The collar 136 is configured to locate the mechanism 130 for alignment with the final drive assembly 108, which includes one or more connectors 140 having one or more engagement structures such as splines 142 configured to engage the mechanism 130.

The mechanism or transmission coupler 130 includes an actuator 144 located between the flange 136 and a plate 146. The plate 146 is operatively connected to a movable connector 148 which moves along a direction 150, which engages with the connector 140. The moveable connector 148 includes one or more engagement structures such as splines 152 configured to engage the splines 142. The movable connector 148 moves along a transmission support or transmission output shaft 153. Once connected, the transmission output shaft 153, also known as the transmission drive element, is engaged with the final drive assembly 108 to move the first drive track 112. The plate 146 defines a generally circular perimeter, such that the plate 146 surrounds the end of the transmission 102. In other embodiments, the plate is other than circular. As described above, FIG. 2 illustrates one-half of the of the transmission 102, such that the movable connector is circumferential about the transmission output shaft 153 and is configured as a coupling shaft.

The actuator 144, in one embodiment, includes a worm drive mechanism 154 including an actuator 156 configured to drive an output shaft 158. In one embodiment, the actuator includes a shaft operatively connected to the output shaft. The output shaft 158 is moved in the direction 150 by rotation of the actuator 156 in either a clockwise or counterclockwise direction. In one rotational direction, the plate 146 and the movable connector 148 are moved toward the final drive mechanism 108 to engage the splines 152 with the splines 142. In the opposite rotational direction, the movable connector is moved away from the final drive mechanism to disengage the splines 152 from the splines 142. In one embodiment, the worm drive mechanism 154 include a worm gear and a worm screw.

The flange 136 includes one or more channels configured to receive one or more connectors 160 which fix the worm drive mechanism 154 to the flange 136. The flange 136 further includes a shaft channel 162 configured to receive the output shaft 158 as it moves away from and toward the flange 136 during movement of the output shaft 158 along the direction 150.

In one embodiment, the actuator 156 is substantially perpendicular to the output shaft 158 to provide access to a knob 164 of the actuator. In this configuration, the actuator 144 requires a minimal amount of space, thereby enabling engagement and disengagement of the transmission output with the final drive assembly 108. In other embodiments, the actuator 156 is inclined with respect to the direction of movement 150.

The plate 146 includes an aperture 166 configured to accept an end 167 of the output shaft 158 which is fixedly connected to the plate 146 to adjust movement of the plate 146 and consequently the coupler 152 in both directions along direction 150. The plate 146 further includes a channel 168 which extends through the plate and which receives a shaft or rod 170 including an end 172 fixedly connected to the flange 136. The channel 168 includes an interior surface slightly larger than an exterior surface of the shaft 170 such that the plate 146 slides along the shaft 170 during movement of the plate 146 toward and away from the splines 142 of the connector 140. While one shaft 170 is illustrated in FIG. 2, in other embodiments, one or more shafts are located in corresponding channels defined in the plate 146, which generally includes a circular perimeter.

The plate 146 includes a centrally located aperture 174 (See FIG. 4) which surrounds the transmission output. The aperture 174 is defined by a rim 176 which is fixedly attached to the moveable connector 148. As the plate 146 moves along the direction 150, the interface between the rim 176 and the connector 148 either pushes or pulls the connector 148 into and out of engagement with the connector 142.

Figure 3:
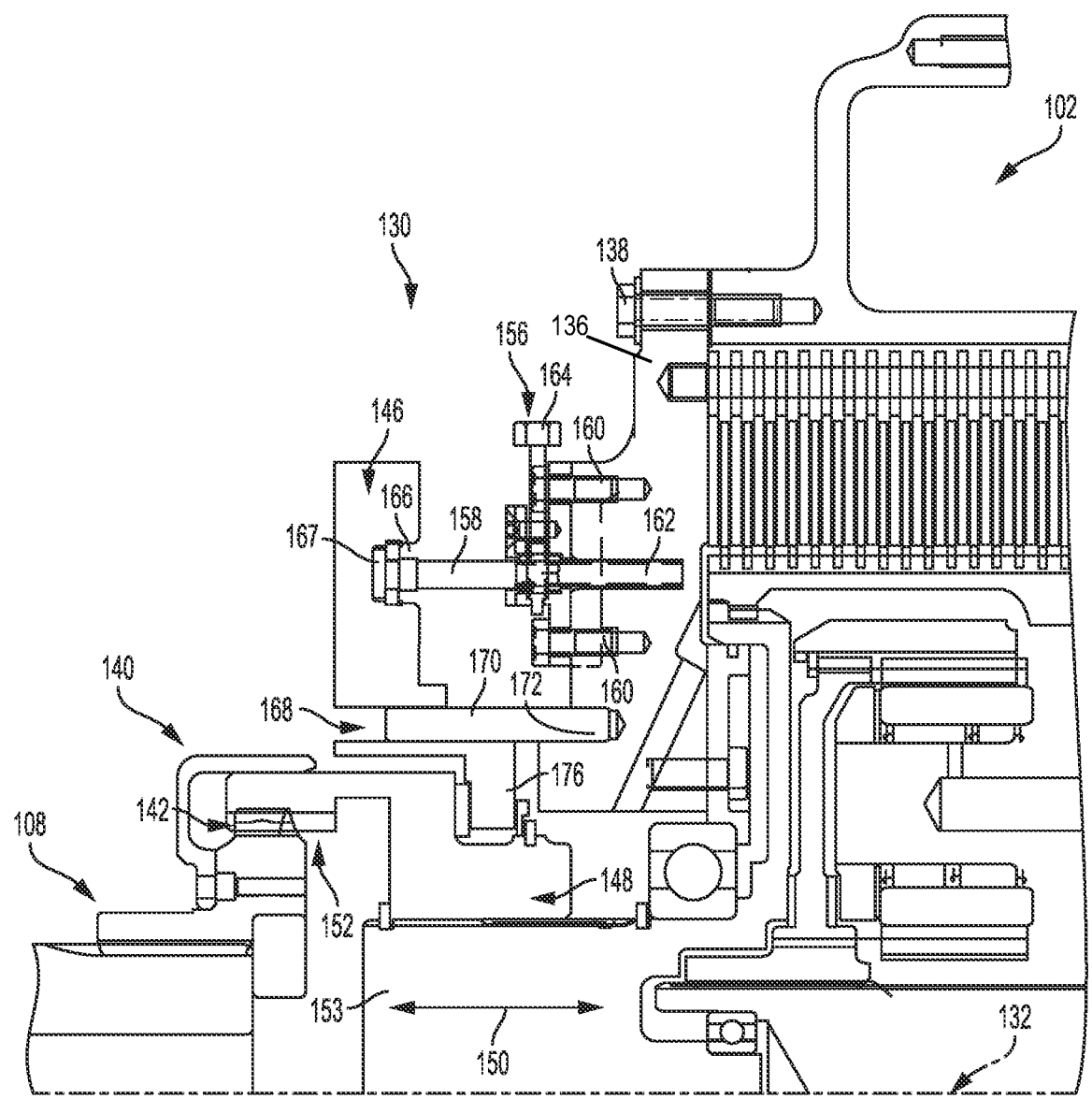
FIG. 3 illustrates a connect/disconnect mechanism of a transmission for connecting to and disconnecting from a final drive assembly in a connected condition.

FIG. 3 illustrates the connection of the transmission 102 with the final drive assembly 108 resulting from a connection of the moveable connector 148 with the connector 140. In this position, the splines 152 are engaged with the spline 142 such that rotation of output of the transmission 102 drives the drive assembly 108 and consequently, the drive track 112. In this embodiment, rotation of the actuator 156 has moved the plate 146 along the shaft 170 such that the transmission output is locked with the final drive assembly 108. An opposite rotation of the actuator 156 moves the moveable connector 148 away from the connector 140 to disengage the splines 152 from the splines 142.

Figure 4:
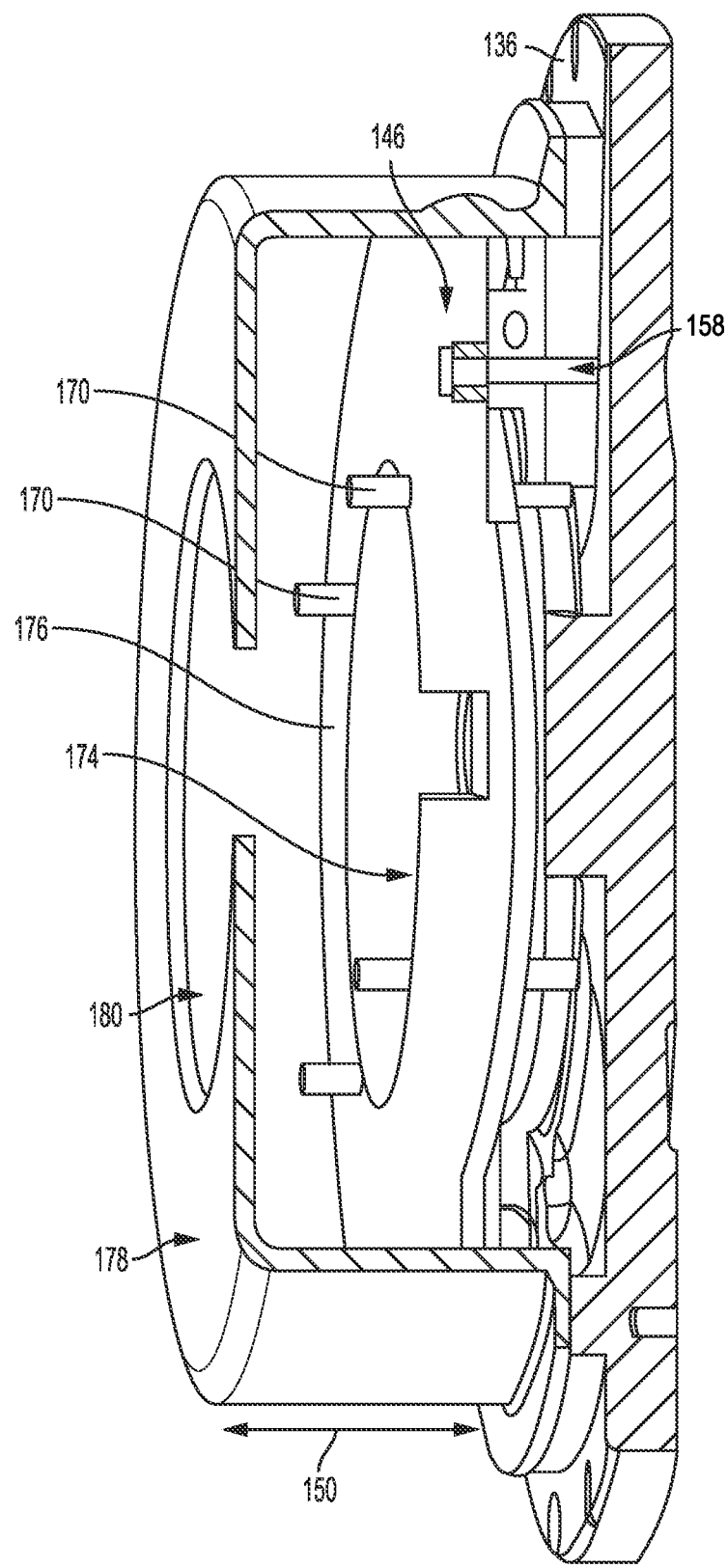
FIG. 4 illustrates a transmission housing adapted to cover a connect/disconnect mechanism of a transmission.

FIG. 4 illustrates a perspective view of one end of the transmission 102 including a partial view of the flange 136 and the plate 146 disposed adjacently to the flange 136. A housing 178 is operatively connected to the flange 136 and defines a cavity 180 in which the plate 146 is located. The plate 146 moves along the direction 150 within the cavity 180 and is supported for longitudinal movement along each of the shafts 170. While four (4) of the shafts or rods 170 are illustrated, other numbers of shafts or rods are contemplated.

As previously described, the actuator 156 engages the plate 146 to adjust the position of the plate with respect to the transmission flange 136 toward and away from the final drive assembly 108. While one actuator 156 is illustrated, in other embodiments, more than one actuator is contemplated. In one embodiment, the housing 178 is removed from the flange 136 to adjust the position of the plate 146. In another embodiment, the housing 178 includes an access hole or aperture (not shown) appropriately located to enable access to the actuator 156.

Figure 5:
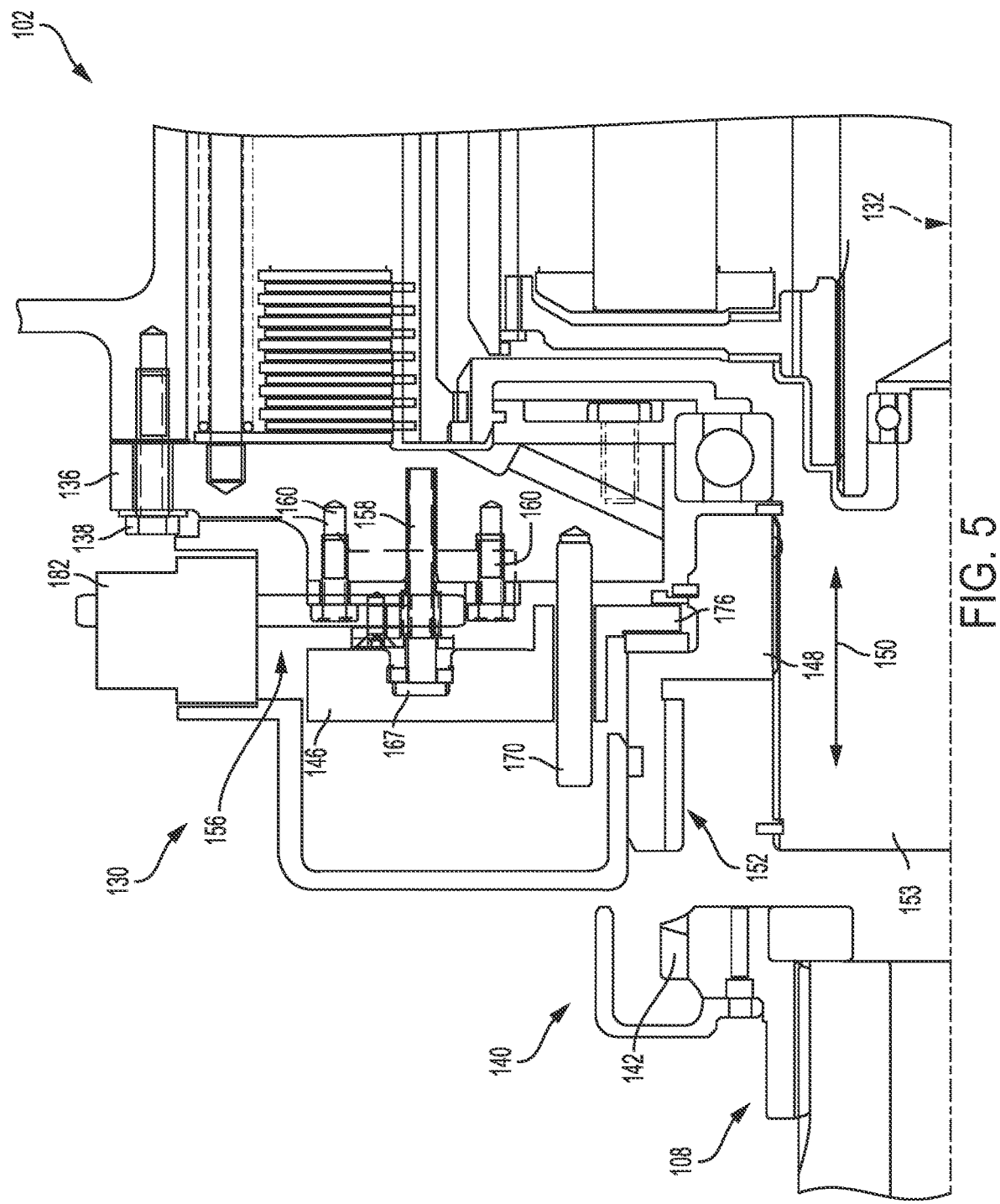
FIG. 5 illustrates another embodiment of a connect/disconnect mechanism of a transmission for connecting to and disconnecting from a final drive assembly in a disconnected condition.

FIG. 5 illustrates another embodiment of the connect/disconnect mechanism or transmission coupler 130. In this embodiment, the actuator 156 includes a motor drive 182 operatively connected to the actuator 156 of the worm drive mechanism 154 to move the plate 146 along the direction 150. The motor drive 182 includes a motor operatively connected to a power source (not shown) which provides sufficient current and voltage to move the splines 152 into and out of engagement with the splines 142. The source of power includes a power control feature, such as a switch, which provides power to the motor drive 182 when needed. In another embodiment, the power control feature includes a controller operatively connected to the motor drive 182. The controller responds to user inputs provided by a user, such as a technician, through a user interface including buttons, switches, and touch screens.

In other embodiments, the actuator 156 is controlled by an electric AC or DC motor, a hydraulic motor, or any type of motor. Alternatively, a tool or mechanism such as a socket wrench or the like may be able to couple to the knob 164 of FIGS. 2 and 3 to rotatably drive the actuator 156. In further embodiments, automatic, semi-automatic, or non-automatic mechanisms for driving the actuator 156 are contemplated. Some of these mechanisms can be electrically-powered, mechanically-powered, hydraulically-powered, pneumatically-powered, or a combination thereof.

Figure 6:
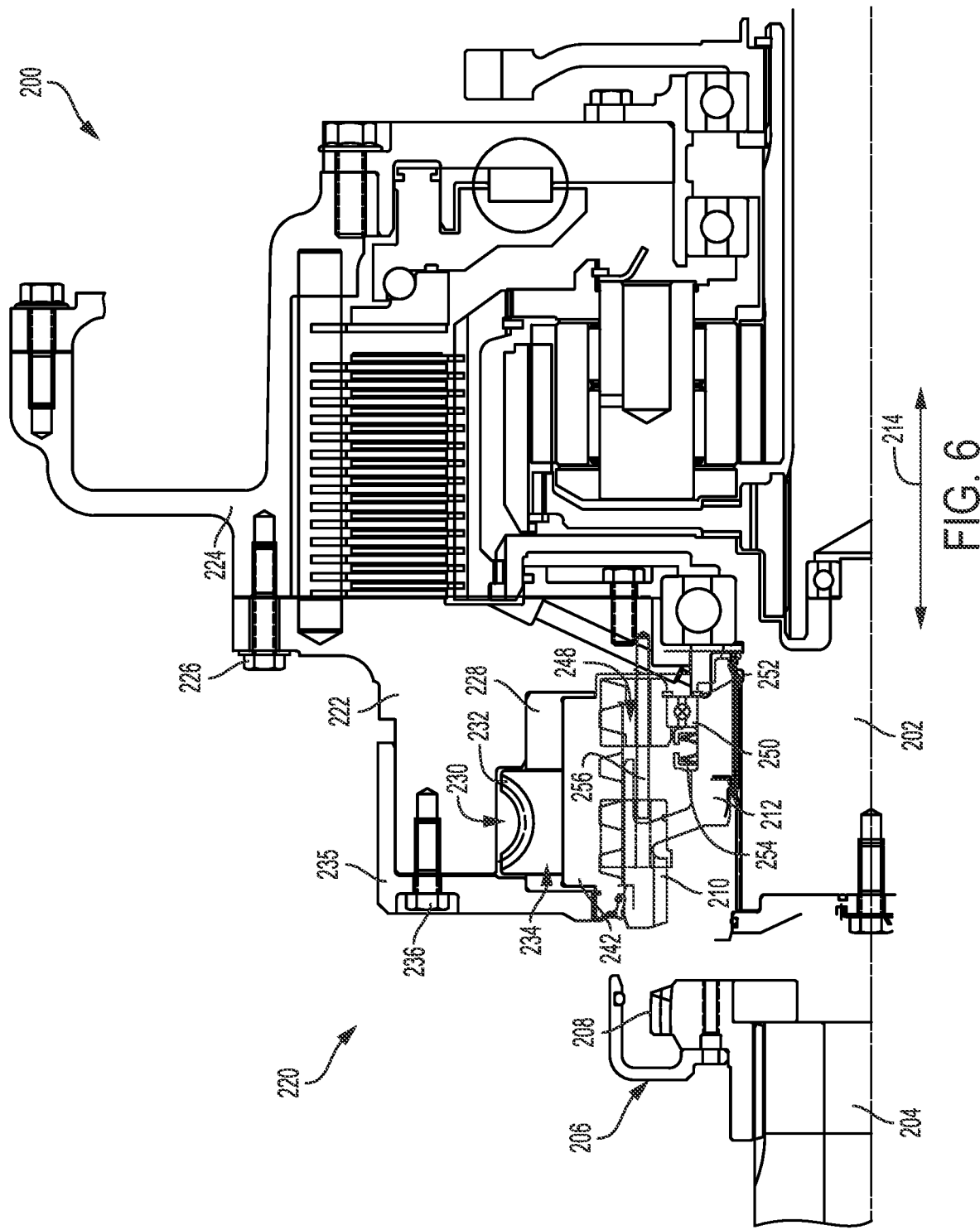
FIG. 6 illustrates another embodiment of a connect/disconnect mechanism of a transmission for connecting to and disconnecting from a final drive assembly in a disconnected condition.
Figure 7:
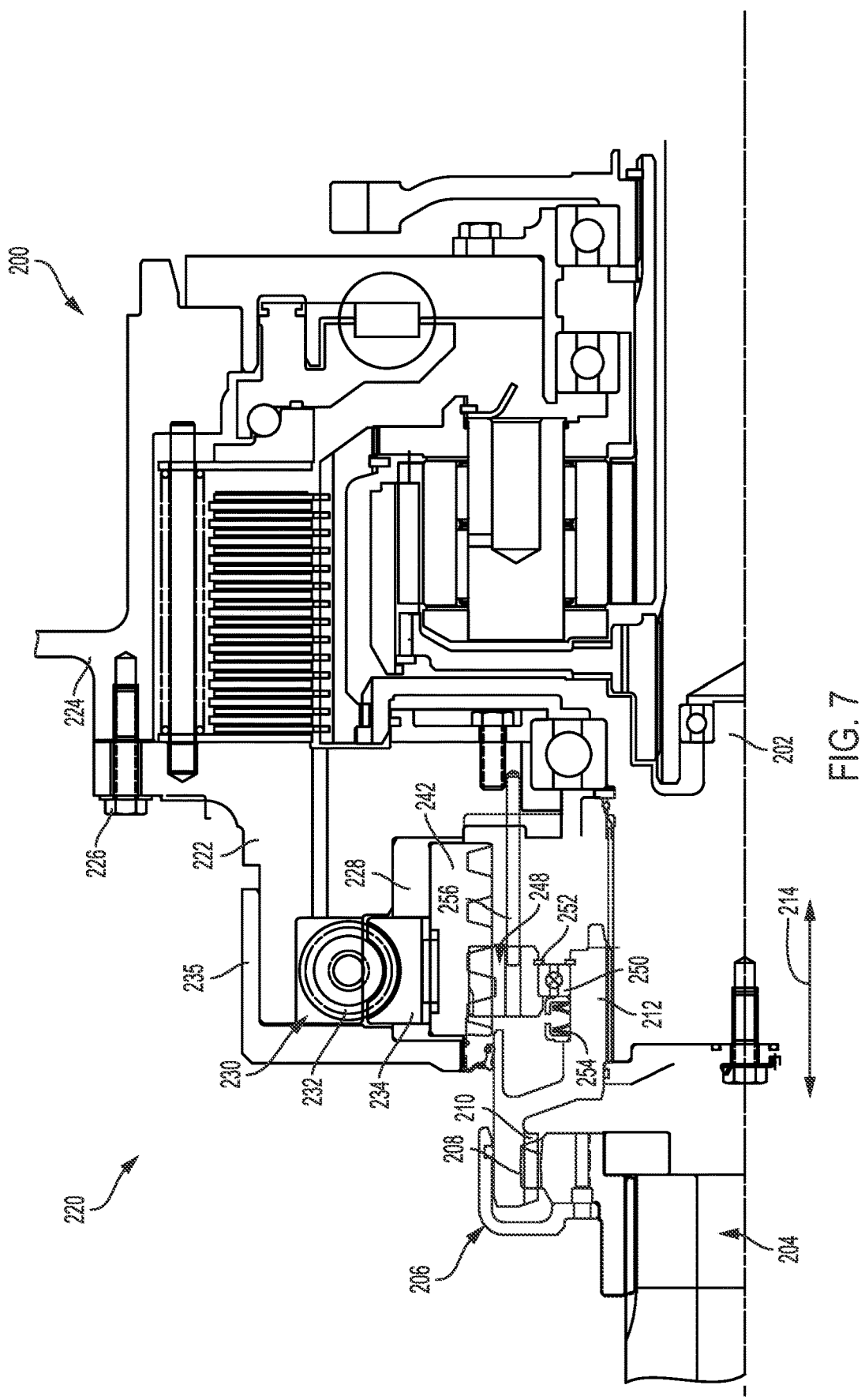
FIG. 7 illustrates another embodiment of a connect/disconnect mechanism of a transmission for connecting to and disconnecting from a final drive assembly in a connected condition.
Figure 8:
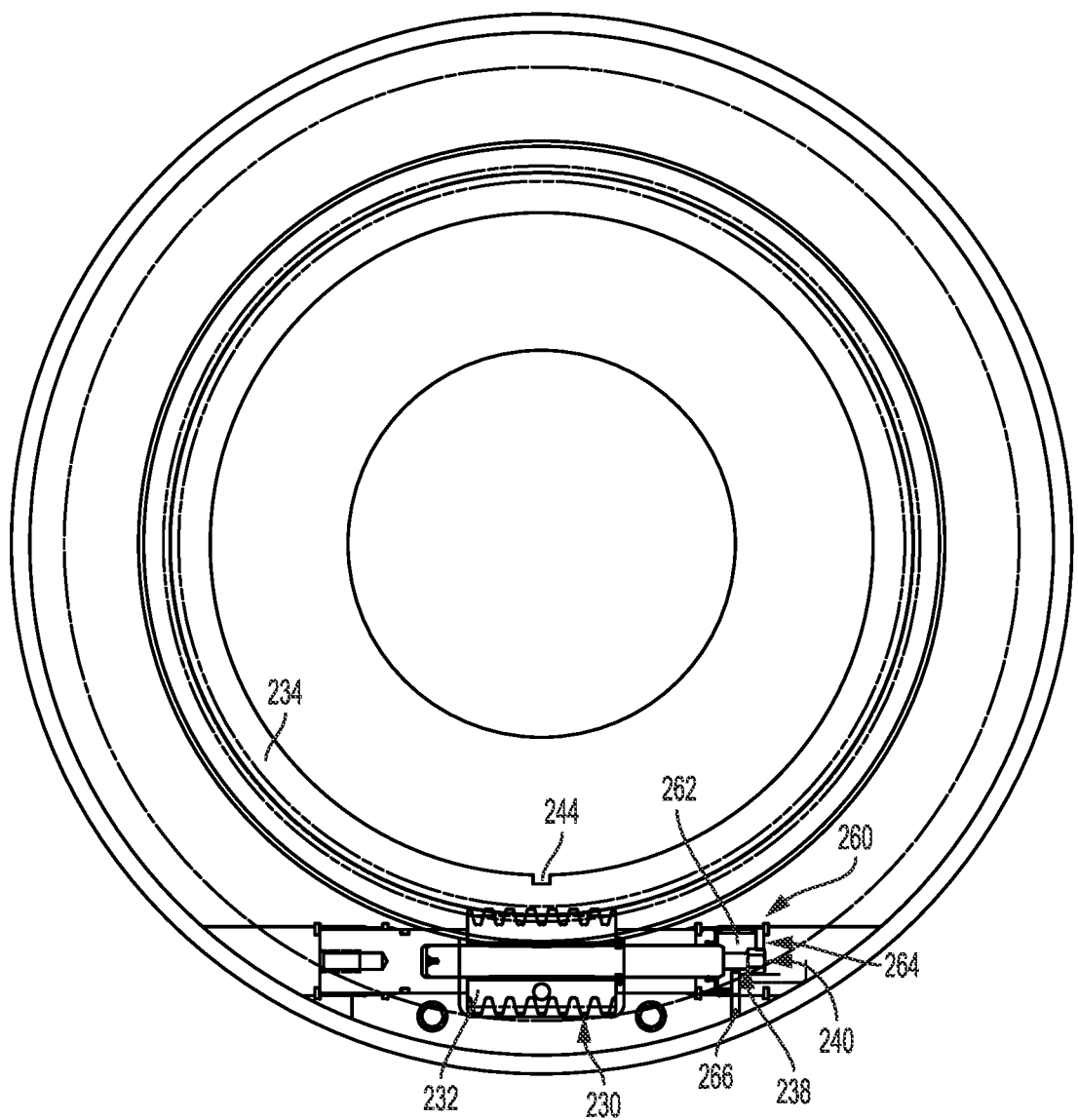
FIG. 8 illustrates an end view of a connected/disconnect mechanism of a transmission.
Figure 9:
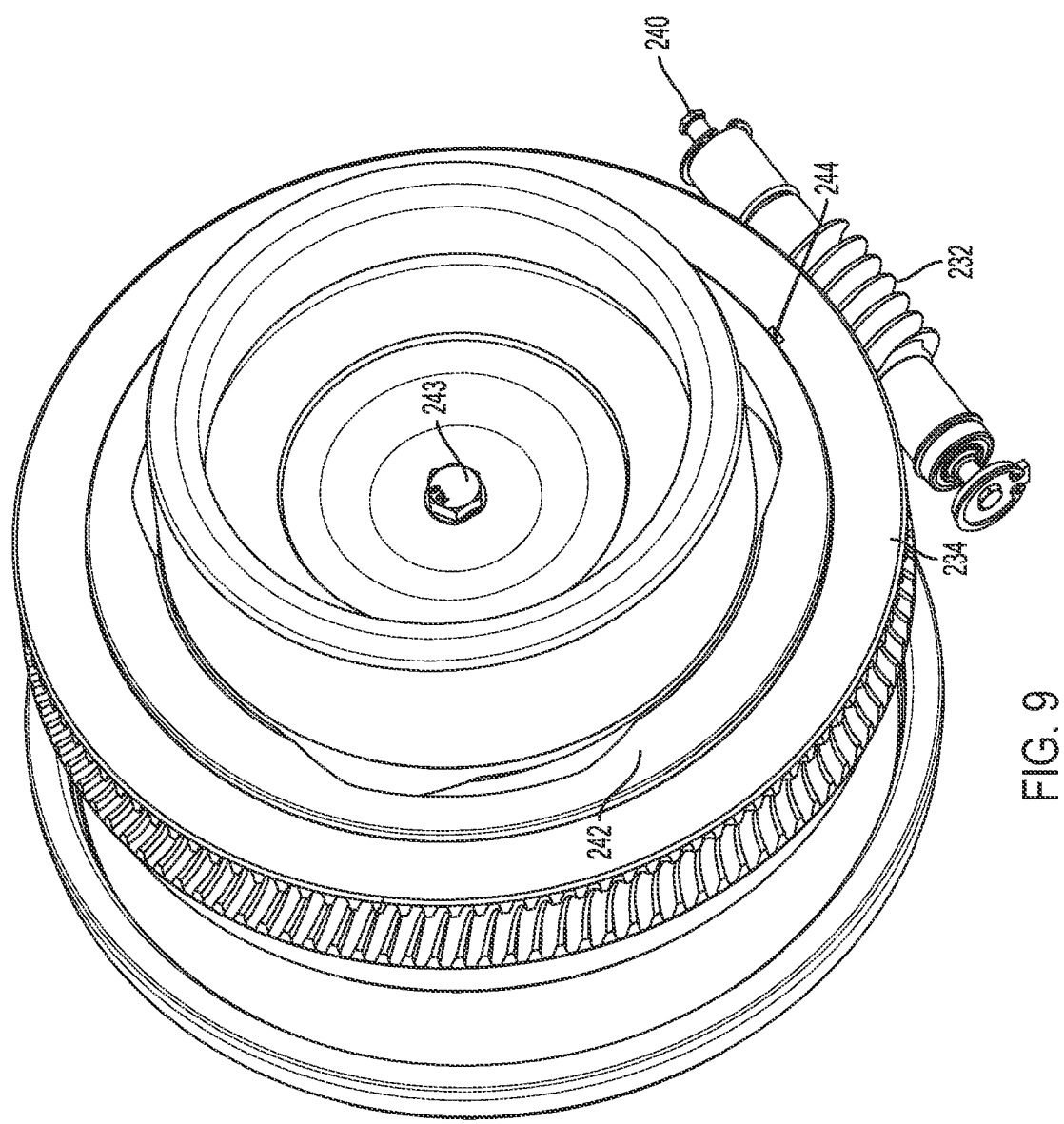
FIGS. 9 and 10 illustrate a perspective end view of a connect/disconnect mechanism of a transmission.
Figure 10:
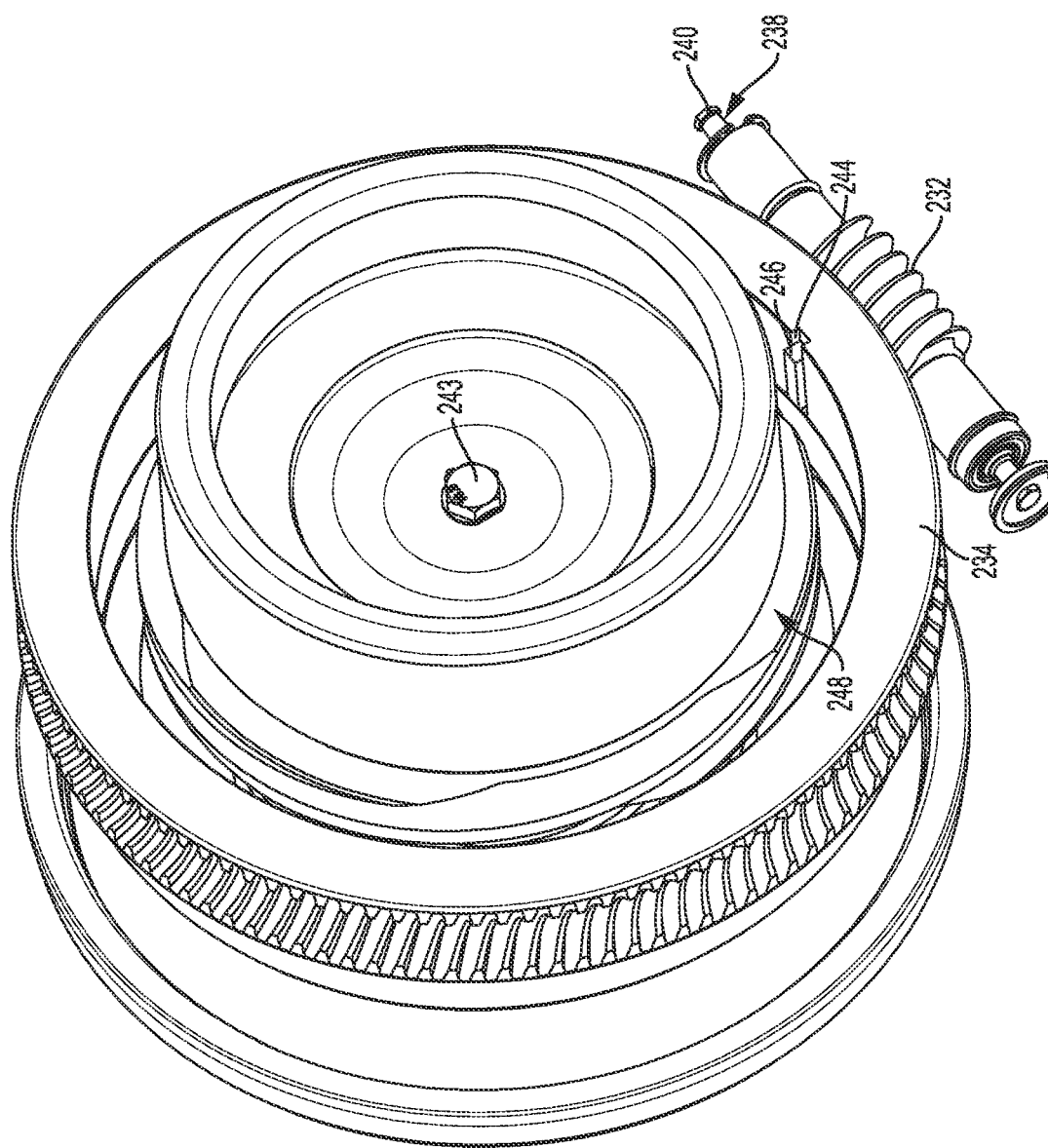

FIGS. 6-10 illustrate a further embodiment of a transmission 200 including a transmission output shaft 202 configured to drive a final drive assembly 204 to drive the drive track 112 of FIG. 1 or other ground engaging mechanism of the vehicle or machine 100. In FIG. 6, the transmission output shaft 202 is disconnected from the final drive assembly 204. See also FIGS. 8-10 illustrating end views of the transmission 200.

The drive assembly 204 includes a connector 206 having splines 208 configured to engage an engagement structure, such as splines 210, of a movable connector 212. In the illustrated embodiment, the movable connector 212 includes a shaft moving along a direction 214 to engage with and to disengage from the connector 206.

A connect/disconnect mechanism or transmission coupler 220 is configured to move the moveable connector 212 from a disconnected position shown in FIG. 6 to a connected position with the drive assembly shown in FIG. 7. The connect/disconnect mechanism 220 includes a flange or collar 222 coupled to a transmission housing 224 of the transmission 200. The collar 222 is fixedly coupled to the housing 224 by one or more connectors 226. The collar 222 includes a cavity or space 228 defining a pocket arranged to hold an actuator or worm drive 230 including a worm gear 232. The worm gear 232 engages a coupling shaft, such as a worm wheel 234, further illustrated in FIG. 9 and FIG. 10.

The worm drive 230 is fixed within the space 228 by a retainer or retaining ring 235 fixedly coupled to the collar 222 by one or more connectors 236. The retainer 235 is generally cylindrical and surrounds the output shaft 202. The worm gear 232 includes an actuator or driver 238 that extends from the worm gear 232 and includes an input interface 240 configured to accept a tool that applies a torque to the driver 238. In one embodiment, the tool is a hand tool, either powered or unpowered, and manipulated by an individual, such as an operator or maintenance person. In another embodiment, the tool is a motor or motor drive controlled by a switch located at or in the vehicle. The application of a torque to the input interface rotates the worm gear 232 about a rotational axis inclined with respect to the direction 214. In one embodiment, the rotational axis of the worm gear 232 is substantially parallel to the direction 214. Other inclinations of the rotational axis of the worm gear 232 with respect to the direction 214 are contemplated.

The worm wheel 234 engages and drives an internal lead screw 242 about a rotational axis defined by an axial center 243 of the output shaft. The worm wheel 234 includes a keyway 244 (see FIGS. 8-10) defining a cavity for a key 246 (see FIG. 10). The key 246 engages a cavity or slot (not shown) in the internal lead screw 242. As the worm drive 230 drives the worm wheel 234 about the rotational axis 243, the worm wheel 234 drives the internal lead screw 242 to rotate about the axis 243. The internal lead screw 242 surrounds and is centered about the axis 243 and drives an external lead screw 248.

A ball bearing 250 is located in a cavity adjacent to the external lead screw 248 and is held in the cavity by a retainer 252. Located adjacently to the ball bearing 250 is a compression spring 254 which abuts the ball bearing 250 and the moveable connector 212. As the external lead screw 248 moves from the location illustrated in FIG. 6 to the location of FIG. 7, the spring 254 moves or drives the moveable connector 212 in response to the movement of the external lead screw 248. The moveable connector 242 is moved toward the drive assembly 206 to engage the transmission output shaft 202 with the final drive assembly 204. The moveable connector 242 is moved away from the drive assembly to disengage the transmission output shaft away from the final drive assembly.

The spring 254 is compression spring configured to aid in the alignment of the splines 210 with the splines 208. If for instance, the splines 210 are not properly aligned with the splines 208, the ends of each of the splines 210 and 208 engage one another and can prevent further movement of the moveable connector 212 toward the drive assembly 206, thereby preventing engagement of the transmission output shaft 202 with the final drive assembly 204. As a result, when the moveable connector 212 moves toward the drive assembly 206, the spring is compressed and provides a resisting force that is apparent to an individual or to a motor drive adjusting the worm drive 230. When this event occurs, the moveable connector 212 is rotated by the operator or motor drive about its axis to align the splines 210 with the splines 208. Once properly aligned, the moveable connector 212 is moved to substantially or to fully engage the splines 210 with the splines 208.

The transmission coupler 220 further includes one or more pins 256 which are configured to substantially prevent rotation of the external lead screw 248 during movement of the connector 212 toward or away from the drive assembly 206. One end of the one or more pins 256 is pressed into an aperture formed in the collar 222 or the housing 224 or both. The other end extends into an aperture of the external lead screw 248. The aperture provides a sliding fit to the pin 256 such that the external lead screw 248 travels axially along the direction 214, while preventing the lead screw 248 from rotating with respect to the internal lead screw 242. Other embodiments are contemplated that do not include the pin(s) 256 or include other mechanisms to substantially prevent rotation of the external lead screw 248 with respect to the internal lead screw 242.

In one or more embodiments, a spring loaded locking mechanism 260 is configured to substantially prevent unintended disengagement of the transmission 200 from the final drive assembly 204. As seen in FIG. 8, the actuator 238 is spring biased by a spring 262 located about a stem of the actuator 238 and is held in place by a plate 264. The plate 264 includes an aperture in its inner dimension to engage a hex shaped input interface 240 and to prevent the interface 240 from being moved. A key on the outer diameter of the plate 264 engages a slot in the housing and the spring 262 holds the plate in engagement with the hex shaped head of input interface 240. In this position, the actuator 238 is prevented from being rotated which prevents disengagement of the transmission 200 from the final drive assembly 204. To disconnect the output of the transmission from the final drive 204, a tool engages the hex shaped interface and the plate 264 is pushed to the left as illustrated at position 266. As the tool engages the interface, the plate 264 compresses the spring 262. Once the tool sufficiently engages the interface, the plate 264 is disengaged from the hex shaped interface to enable the tool to rotate the actuator 238. Rotation of the actuator disengages the output of the transmission 200 from the final drive assembly 204. Other configurations of the actuator 240 and the actuator receiving hole in the plate 264 are contemplated.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle drivetrain including a transmission configured to move a vehicle with a surface engaging traction member, the vehicle drivetrain comprising:
   a final drive assembly configured to drive the surface engaging traction member, the final drive assembly including a drive assembly connector;
   a collar connected to a housing of the transmission; and
   a transmission coupler coupled to the transmission and disposed between the transmission and the final drive assembly, wherein the transmission coupler includes:
      a worm gear located next to the collar;
      a worm wheel having an internal lead screw, wherein the worm gear engages the worm wheel to rotate the worm wheel and wherein the internal lead screw is centered about an axial center of a transmission output shaft; and an external lead screw engaging the internal lead screw of the worm wheel, wherein the internal lead screw drives the external lead screw to move a movable connector along the transmission output shaft to engage the drive assembly connector and to couple the transmission to the final drive assembly.

2. The vehicle drivetrain of claim 1 wherein the transmission coupler includes a mechanism to substantially prevent rotation of the external lead screw from rotation with respect to the internal lead screw.

3. The vehicle drivetrain of claim 2 wherein the mechanism includes a pin connected to the collar and to the external lead screw.

4. The vehicle drivetrain of claim 3 external lead screw includes an aperture to provide a sliding fit to the pin.

5. The vehicle drivetrain of claim 4 wherein the movable connector includes an engagement structure configured to engage an engagement structure of the of the drive assembly connector.

6. The vehicle drivetrain of claim 5 wherein the engagement structure of the movable connector include splines.

7. The vehicle drivetrain of claim 6 further comprising a spring disposed between the external lead screw and the movable connector to aid in the alignment of the movable connector with the drive assembly connector.

8. The vehicle drivetrain of claim 7 further comprising a ball bearing located in a retainer adjacent to the external lead screw and to the spring, wherein the external lead screw moves the retainer, the spring, and the movable connector toward or away from the final drive assembly to engage and disengage the transmission with the final drive assembly.

9. The vehicle drivetrain of claim 8 wherein the worm gear includes an input interface adapted to adjust a position of the worm wheel in response to a torque applied about a rotation axis of the worm gear.

10. The vehicle drivetrain of claim 9 wherein the internal lead screw drives the external lead screw in a moving direction between the transmission and the drive assembly coupler, and the rotation axis of the worm gear is inclined with respect to the moving direction.

11. A vehicle having a surface engaging traction member, the vehicle comprising:
a final drive assembly configured to drive the surface engaging traction member, the final drive assembly including a drive assembly connector;
a transmission having a housing;
a collar connected to the housing of the transmission; and
a transmission coupler coupled to the transmission and disposed between the transmission and the final drive assembly, wherein the transmission coupler includes:
a worm gear located next to the collar;
a worm wheel having an internal lead screw, wherein the worm gear engages the worm wheel to rotate the worm wheel and wherein the internal lead screw is centered about an axial center of a transmission output shaft; and
an external lead screw engaging the internal lead screw of the worm wheel, wherein the internal lead screw drives the external lead screw to move a movable connector along the transmission output shaft to engage the drive assembly connector and to couple the transmission to the final drive assembly.

12. The vehicle of claim 11 wherein the transmission coupler includes a mechanism to substantially prevent rotation of the external lead screw from rotation with respect to the internal lead screw.

13. The vehicle drivetrain of claim 12 wherein the mechanism includes a pin connected to the collar and to the external lead screw.

14. The vehicle drivetrain of claim 13 external lead screw includes an aperture to provide a sliding fit to the pin.

15. The vehicle drivetrain of claim 14 wherein the movable connector includes an engagement structure configured to engage an engagement structure of the of the drive assembly connector.

16. The vehicle drivetrain of claim 15 wherein the engagement structure of the movable connector include splines.

17. The vehicle drivetrain of claim 16 further comprising a spring disposed between the external lead screw and the movable connector to aid in the alignment of the movable connector with the drive assembly connector.

18. The vehicle drivetrain of claim 17 further comprising a ball bearing located in a retainer adjacent to the external lead screw and to the spring, wherein the external lead screw moves the retainer, the spring, and the movable connector toward or away from the final drive assembly to engage and disengage the transmission with the final drive assembly.

19. The vehicle drivetrain of claim 18 wherein the worm gear includes an input interface adapted to adjust a position of the worm wheel in response to a torque applied about a rotation axis of the worm gear.

20. The vehicle drivetrain of claim 19 wherein the internal lead screw drives the external lead screw in a moving direction between the transmission and the drive assembly coupler, and the rotation axis of the worm gear is inclined with respect to the moving direction.

\* \* \* \* \*